United States Patent [19]

Joy

[11] Patent Number: 4,818,397
[45] Date of Patent: Apr. 4, 1989

[54] SHUT-OFF VALVE SEAL

[75] Inventor: Theodore J. Joy, Rockford, Ill.

[73] Assignee: Sundstrand Corporation, Rockford, Ill.

[21] Appl. No.: 944,959

[22] Filed: Dec. 22, 1986

[51] Int. Cl.⁴ .............................................. B01D 27/10
[52] U.S. Cl. .................... 210/232; 210/234; 210/235; 210/430; 210/432; 210/440; 210/450; 55/502; 251/335.1; 251/340; 251/900
[58] Field of Search ............ 251/355.1, 339, 362, 251/363, 900, 340; 210/232, 234, 235, 418, 430, 432, 435, 440, 443, 450, 451; 55/502, 503, 505, 507

[56] References Cited

U.S. PATENT DOCUMENTS

| | | | |
|---|---|---|---|
| 2,431,782 | 12/1947 | Walton et al. | 210/234 |
| 2,945,591 | 7/1960 | Pall | 210/234 |
| 2,978,107 | 4/1961 | Gutkowski et al. | 210/235 |
| 3,040,894 | 6/1962 | Pall | 210/235 |
| 3,283,907 | 11/1966 | Whiting | 210/234 |
| 3,319,791 | 5/1967 | Horne | 210/234 |
| 3,368,680 | 2/1968 | Bozek | 210/234 |
| 3,628,662 | 12/1971 | Kudlaxy | 210/234 |
| 3,912,630 | 10/1975 | Reighard et al. | 210/234 |
| 4,077,876 | 3/1978 | Southall | 210/235 |
| 4,082,673 | 4/1978 | Cilento | 210/234 |

FOREIGN PATENT DOCUMENTS

| | | |
|---|---|---|
| 622865 | 6/1961 | Canada . |
| 1180717 | 11/1964 | Fed. Rep. of Germany . |
| 1240043 | 7/1960 | France . |
| 707718 | 4/1954 | United Kingdom . |

*Primary Examiner*—Richard V. Fisher
*Assistant Examiner*—Wanda L. Millard
*Attorney, Agent, or Firm*—Wood, Dalton, Phillips, Mason & Rowe

[57] ABSTRACT

A shut-off valve sealing system for a removable cartridge-type filter which includes a body having an inlet to conduct fluid to be filtered therethrough to an inlet of the filter cartridge. The body has an outlet to conduct filtered fluid therethrough from an outlet of the filter cartridge when supported on the body, and a central opening in communication with the inlet and the outlet. A seal member is provided on the body about the central opening. A valve member is movably mounted on the body and movable against the seal member to shut off the inlet when the filter cartridge is removed from the body. A retainer member is provided for retaining the seal member on the body, the retainer member projecting beyond the seal member and providing a stop for stopping movement of the valve member.

17 Claims, 2 Drawing Sheets

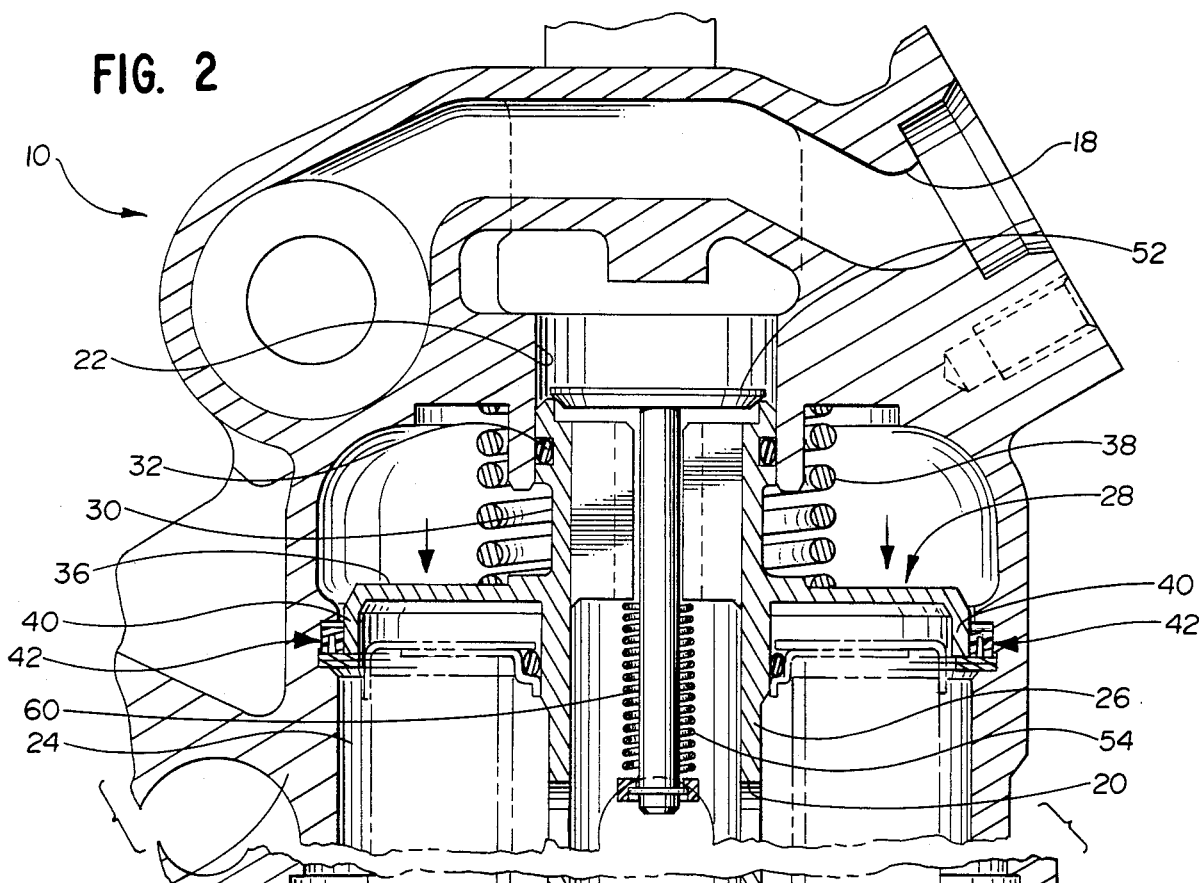
FIG. 2
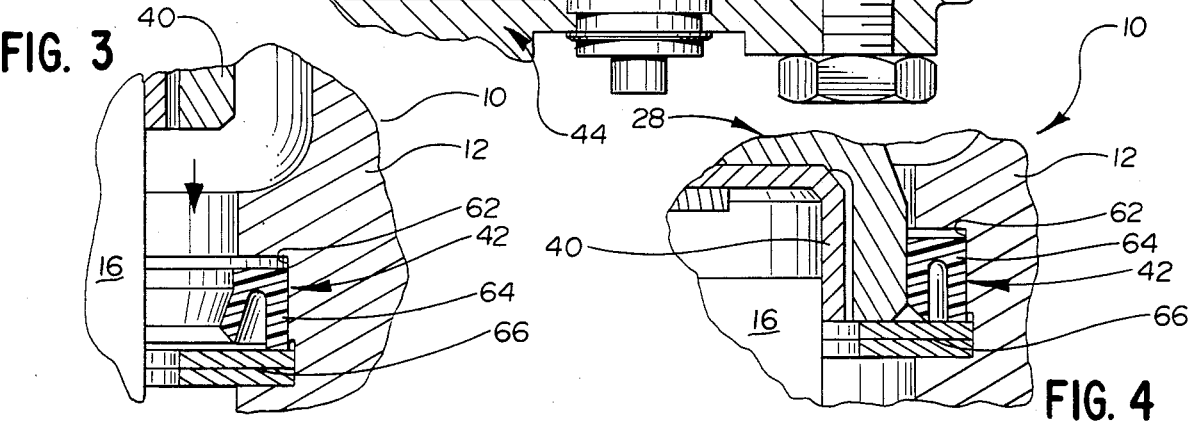
FIG. 3
FIG. 4

SHUT-OFF VALVE SEAL

FIELD OF THE INVENTION

This invention generally relates to removable cartridge-type filter assemblies and, particularly, to a shut-off valve seal assembly for using with such filter assemblies, or the like.

BACKGROUND OF THE INVENTION

Many types of filters and filter assemblies presently are available for removing suspending foreign matter from fluids such as lubricating oil, hydraulic fluids and the like. Various filters are used in hydraulic systems for aircraft in filtering hydraulic fluid in high pressure hydraulic fluid systems. Under such conditions, the filters must be serviced without external leakage when cleaning, servicing or maintenance is required, and which can be reassembled without external leakage from the system. Such filters of varying types employ removable cartridges whereby, when a filter cartridge becomes spent, the cartridge is readily replaceable with a fresh cartridge. Failure or inadvertent leakage or actuation of the fluid stream valve while the cartridge assembly and/or associated connections are removed can create undesirable conditions.

To overcome these problems, various arrangements in the prior art provide for locking or latching the valves within the fluid stream to prevent accidental flow during replacement of the filter media. Many such arrangements are complex, cumbersome and can themselves become contaminated and cause undesirable leakage.

This invention is directed to solving the problem of fluid leakage in a removable cartridge-type filter by employing a novel seal means which performs the dual function of sealing the inlet fluid stream when a cartridge is removed and for providing a stop limit for movement of the sealing valve.

SUMMARY OF THE INVENTION

An object, therefore, of the invention is to provide a new and improved shut-off valve sealing system for a filter cartridge or the like.

Another object is to provide a dual-purpose shut-off valve sealing system for use in removable cartridge-type filter assemblies.

In the exemplary embodiment of the invention, the shut-off valve sealing system includes a main body having an inlet to conduct fluid to be filtered therethrough to an inlet of a filter cartridge, an outlet to conduct filtered fluid therethrough from an outlet of the filter cartridge when supported on the main body, and a central opening in communication with the inlet and the outlet. A seal member is provided on the maian body about the central opening. A valve member is provided on the main body and movable against the seal member to shut-off the inlet when the filter cartridge is removed from the main body. Generally, retainer means are provided for retaining the seal member on the body, the retainer means projecting beyond the seal member and performing the dual function of providing a stop means for stopping movement of the valve member.

As disclosed in the preferred embodiment, an annular groove is formed in the main body about the central opening, outside of or surrounding the filter cartridge. The seal member comprises a seal ring disposed in the groove and projecting inwardly therefrom for engaging the valve member. The retainer means comprises a rigid stop ring disposed in the groove and projecting therefrom beyond the seal ring for engaging and stopping movement of the valve member.

The valve member is, at least in part, reciprocally mounted in the central opening of the main body and includes abutment means engageable with the filter cartridge to hold the valve member in open condition when the filter cartridge is supported on the main body. Spring means are provided between the main body and the valve member for automatically moving the valve member against the seal ring when the valve cartridge is removed from the main body. Check valve means on the valve member allow flow therethrough of liquid from the inlet, through the central opening to the outlet, but prevents flow in the opposite direction.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which;

FIG. 2 is a view similar to that of FIG. 1, with the filter cartridge about to be completely removed from the assembly, and with the shut-off valve seal in closed condition;

FIG. 3 is a fragmented sectional view, on an enlarged scale, of the shut-off valve seal in open condition; and FIG. 4 is a view similar to that of FIG. 3 with the shut-off valve seal in closed condition.

DETAILED DESCRIPTION OF THE PREFERRED EMBODIMENT

Figure 1:
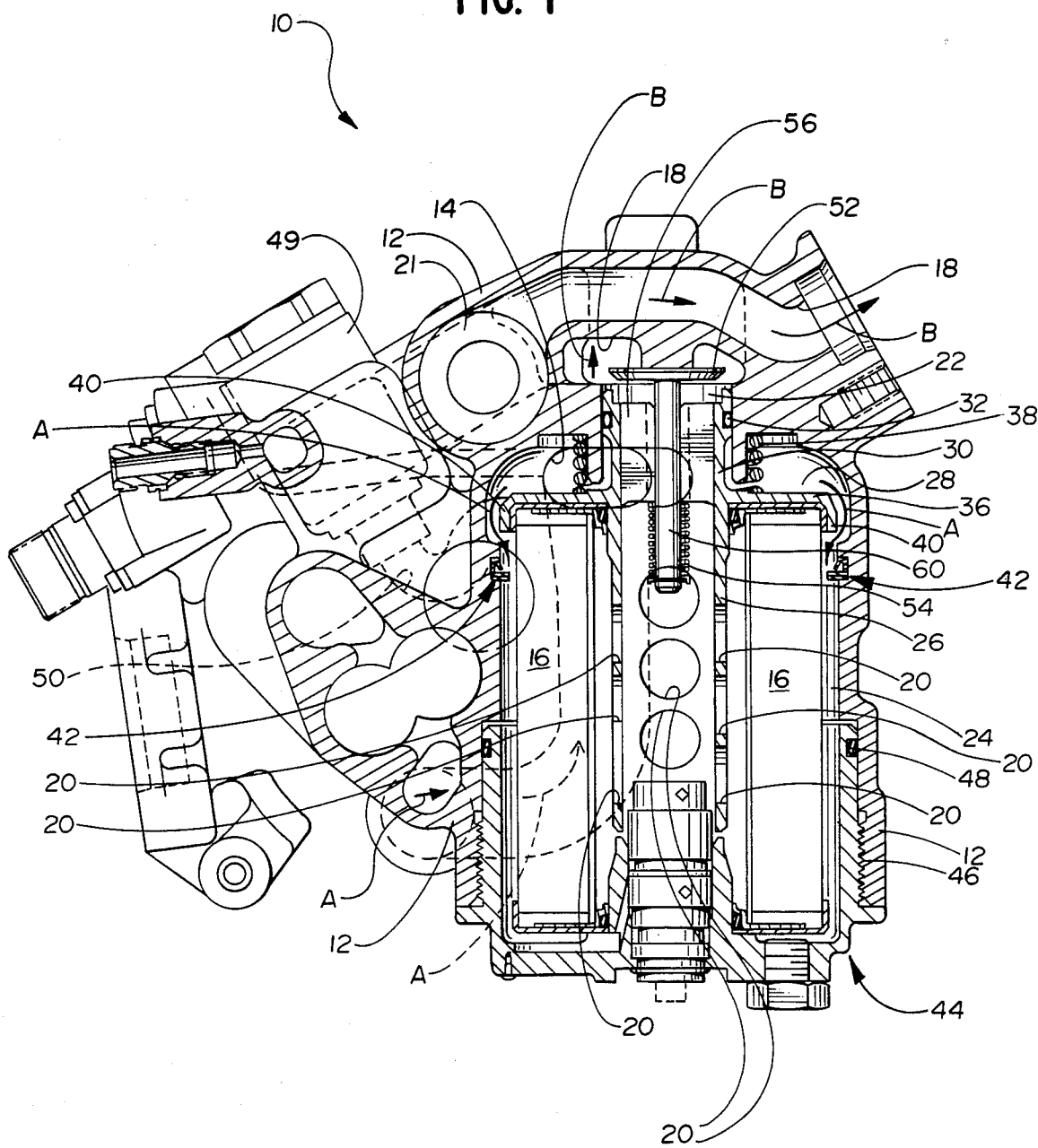
FIG. 1 is an axial section through a removable cartridge-type filter assembly incorporating the shut-off valve sealing system of the invention, illustrating the operating state of the filter cartridge mounted in the assembly and the shut-off valve seal in open condition.

Referring to the drawings in greater detail, and first to FIG. 1, a removable cartridge-type filter assembly, generally designated 10, includes a main body 12 having an inlet 14 to conduct fluid to be filtered therethrough to an inlet of a cylindrical fitler cartridge 16, as indicated by arrows "A". The main body includes an outlet 18 to conduct filtered fluid therethrough, as indicated by arrows "B", from outlets 20 of filter cartridge 16 when the filter cartridge is supported on or in the main body. A flow control valve 21 is disposed in the discharge. The main body further includes a central opening 22 in communication with inlet 14 and outlet 18. Actually, the inlet to filter cartridge 16 is provided by a main cavity 24 within the main body surrounding the filter cartridge, and outlets 20 are located inside the filter cartridge in a valve stem 26 of a valve member, generally designated 28 and described hereinafter.

More particularly, valve member 28 includes a cylindrical portion 30 projecting into central opening 22 of the main body. O-ring seals 32 seal the outer periphery of cylindrical portion 30 and the central opening. An annular flange 36 projects radially outwardly of cylindrical portion 30 and valve stem 26 to form abutment means on the top side thereof for a coil spring 38, and abutment means on the bottom side thereof for cylindrical filter cartridge 16. Spring 38 is sandwiched between flange 36 and the main body for automatically moving the valve member toward closed condition when filter cartridge 16 is removed, as described hereinafter.

The actual valve portion of valve member 28 comprises a cylindrical lip 40 projecting axially downwardly about the periphery of annular flange 36 for engaging seal means, generally designated 42, in main body 12, surrounding main filter cavity 24 outside filter cartridge 16.

Filter cartridge 16 is mounted within main body 12 in abutment with flange 36 of valve member 28 by means of a body cap, generally designated 44. The cap is threaded into a bottom opening of the main body, as at 46. An O-ring seal 48 between the cap and the main body prevents leakage from filter cavity 24 to the exterior of the assembly. Main body 12 is provided with a relief valve 49 ad bypass channel means 50 to allow the fluid to bypass the filter cartridge and move upwardly toward outlet 18 in the event that the filter cartridge becomes unduly clogged.

A check valve 52 is provided at the top of valve member 28 for sealing with the upper distal periphery of cylindrical portion 30 to allow the fluid to flow therethrough between the inlet and the outlet of the main body. The check valve includes a coil spring 54 sandwiched between radial ribs 56 of valve member 28 and an annular flange 58 on the lower distal end of a check valve stem 60 to bias the check valve toward closed condition to prevent reverse flow of fluid through the valve assembly when system fluid is not moving.

FIG. 2 shows valve assembly 10 with filter cartridge 16 being removed therefrom for replacement purposes or for other maintenance of the assembly. More particularly, it can be seen that body cap 44 has been threaded out of the bottom of main body 12 whereby the upper end of filter cartridge 16 has been moved out of abutment with the underside of valve member 28. When this removal operation is effected, coil spring 38 biases valve member 28 toward closed condition. Specifically, annular lip 40 is automatically moved by the spring into engagement with seal means 42. In this condition, incoming flow of fluid through inlet 14 is blocked because the fluid cannot pass beyond valve member 28 and seal means 42. As will be seen hereinafter, seal means 42 performs a novel dual function of not only providing a seal with valve member 28 but providing a stop limit for the extend of movement of the valve member.

After replacement of filter cartridge 16, filter cap 44 again is threaded into the bottom of main body 12 whereupon the top of the filter cartridge abuts the underside of valve member 28, moving the valve member against the biasing of spring 38, moving lip 40 off of seal means 42, and thereby again opening the flow system through the valve assembly.

FIGS. 3 and 4 show in greater detail the novel seal means 42 of this invention. More particularly, an annular groove 62 is formed in main body 12 radially outwardly of central opening 22 and outside of and surrounding filter cartridge 16. A circular seal ring 64 is disposed in groove 62 and projects radially inwardly of the groove for engagement by lip 40 of valve member 28. A rigid stop ring 66 also is disposed in groove 64 and projects radially inwardly therefrom beyond seal ring 64 for engaging and stopping movement of valve member 28. This is shown in FIG. 4 where it can be seen that lip 40 of valve member 28 has moved to closed condition where it compresses seal ring 64 to seal the inlet passages of the valve assembly and where the lip is stopped by abutment with rigid stop ring 66.

As seen clearly in FIGS. 3 and 4, seal ring 64 is formed in a generally inverted U-shaped with depending, spread leg portions. The leg portions are biased outwardly and it can be seen that the right-hand leg as viewed in FIGS. 3 and 4 has been biased inwardly to establish a tight seal with the surrounding wall of groove 62. When lip 40 of valve member 28 moves into engagement with seal ring 64, the lip biases the left-hand leg (as viewed in FIGS. 3 and 4) radially outwardly as shown in FIG. 4, to establish a tight seal between the seal ring and the outer peripheral surface of lip 40. The left-hand leg may be pointed at its distal end, as shown, to further enhance the sealing function of the ring. Stop ring 66 holds seal ring 64 in groove 62 and enables the sealing movement of the legs of the seal ring across the top surface of the stop ring.

Stop ring 66 is shown laminated in the drawings to illustrate that it is a compressible ring formed by an open-ended circular member which is overlapped. This enables the stop ring to be compressed and assembled in groove 62. The stop ring is fabricated of metal or like material wherein the ring automatically expands and snaps into the groove when assembled thereinto.

From the foregoing, it can be seen that a sealing system has been provided by seal ring 64 and stop ring 66 whereby the combination of elements not only shuts off the incoming fluid into the valve assembly, but the system provides an extremely simple means for stopping movement of valve member 28 to maintain the valve member in position for receiving and properly positioning a new filter cartridge 16 when mounted into the valve assembly.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A shut-off valve sealing system in a removable cartridge-type filter assembly comprising:

a body having an inlet to conduct fluid to be filtered therethrough to an inlet of a filter cartridge, an outlet to conduct filtered fluid therethrough from an outlet of the filter cartridge when supported on the body, and a central opening in communication with the inlet and the outlet;

a seal member on the body about said central opening;

a valve member on the body and movable in an axial path against a radial inner side of the seal member to shut off the inlet when the filter cartridge is removed from the body; and retainer means for retaining the seal member on the body, the retainer means projecting beyond the inner side of the seal member and into the path of movement of the valve member to provide a stop means for direct engagement with the valve member to stop movement of the valve member whereby, in shut condition, the seal member engages a side of the valve member and the retainer means directly engages an axial end of the valve member.

2. The shut-off valve sealing system of claim 1, including an annular groove formed in the body about the central opening and outside the filter cartridge, said seal member comprising a seal ring disposed in said groove and radially projecting therefrom for engaging the side of the valve member.

3. The shut-off valve sealing system of claim 2 wherein said retainer means comprises a rigid stop ring disposed in said groove and projecting therefrom beyond the seal ring for directly engaging and stopping movement of the valve member.

4. The shut-off valve sealing system of claim 3 wherein the valve member moves in a shut-off direction, and said seal ring and said stop ring are disposed in the groove such that the valve member first engages the radial inner side of the seal ring and then directly engages the stop ring.

5. The shut-off valve sealing system of claim 1 wherein said valve member includes abutment means engageable by the filter cartridge to hold the valve member in open condition when the filter cartridge is supported on the body.

6. The shut-off valve sealing system of claim 5, including spring means between the body and the valve member for automatically moving the valve member against the seal member when the filter cartridge is removed from the body.

7. The shut-off valve sealing system of claim 1 wherein said valve member is at least in part reciprocally mounted in said central opening.

8. The shut-off valve sealing system of claim 7, including check valve means on said valve member to allow flow therethrough of liquid from the inlet, through the central opening to the outlet, but to prevent flow in the opposite direction.

9. A shut-off valve sealing assembly in a removable cartridge-type filter assembly comprising;
a body having an inlet to conduct fluid to be filtered therethrough to an inlet of a filter cartridge, an outlet to conduct filtered fluid therethrough from an outlet of the filter cartridge when supported on the body, and a central opening in communication with the inlet and the outlet;
a valve member on the body, at least in part in the central opening, and movable in an axial path in a shut-off direction to shut off the inlet when the filter cartridge is removed from the body;
seal means including an annular groove formed in the body about the central opening and outside the filter cartridge, and a seal ring disposed in the groove and projecting radialy inwardly therefrom for engagement of a radial inner side of the seal ring by the valve member when the valve member moves in said shut-off direction; and
retainer means for retaining the seal ring in the groove, the retainer means projecting radially inwardly beyond the inner side of the seal member and into the path of movement of the valve member to provide a stop means for direct engagement with the valve member to stop movement of the valve member whereby, in shut condition, the seal member engages a side of the valve member and the retainer means directly engages an axial end of the valve member.

10. The shut-off valve sealing system of claim 9 wherein said retainer means comprises a rigid stop ring disposed in said groove and projecting therefrom beyond the seal ring for directly engaging and stopping movement of the valve member.

11. The shut-off valve sealing system of claim 10 wherein said seal ring and said stop ring are disposed in the groove such that the valve member first engages the radial inner side of the seal ring and then directly engages the stop ring.

12. The shut-off valve sealing system of claim 9 wherein said valve member includes abutment means engageable by the filter cartridge to hold the valve member in open condition when the filter cartridge is supported on the body.

13. The shut-off valve sealing system of claim 12, including spring means between the body and the valve member for automatically moving the valve member against the seal member when the filter cartridge is removed from the body.

14. The shut-off valve sealing system of claim 9, including check valve means on said valve member to allow flow therethrough of liquid from the inlet, through the central opening to the outlet, but to prevent flow in the opposite direction.

15. A shut-off valve sealing system a removable cartridge-type filter assembly comprising:
a body to conduct fluid to be filtered therethrough to an inlet of a filter cartridge, and an outlet to conduct filtered fluid therethrough from an outlet of the filter cartridge when supported on the body;
seal means on the body about the filter cartridge;
valve means on the body and movable in an axial path against a radial inner side of the seal means to shut off the inlet when the filter cartridge is removed from the body; and
retainer means for retaining the seal means on the body, the retainer means projecting beyond the inner side of the seal means and into the path of movement of the valve means to provide a stop means for direct engagement with the valve means to stop movement of the valve means whereby, in shut condition, the seal means engages a side of the valve means and the retainer means directly engages an axial end of the valve means.

16. The shut-off valve sealing system of claim 15 wherein said seal means includes an annular groove formed in the body outside the filter cartridge, and a seal ring disposed in the groove and radially projectig therefrom for engaging the side of the valve means.

17. The shut-off valve sealing system of claim 16 wherein said retainer means comprises a rigid stop ring disposed in said groove and projecting therefrom beyond the seal ring for engaging and stopping movement of the valve means.

* * * * *